(12) United States Patent
Spiess (10) Patent No.: US 8,098,638 B2
(45) Date of Patent: Jan. 17, 2012

(54) SELECTION OF NETWORK NODES OF A NETWORK

(75) Inventor: Patrik Spiess, Karlsruhe (DE)

(73) Assignee: SAP AG, Walldorf (DE)

( * ) Notice: Subject to any disclaimer, the term of this patent is extended or adjusted under 35 U.S.C. 154(b) by 1424 days.

(21) Appl. No.: 11/442,763

(22) Filed: May 30, 2006

(65) Prior Publication Data

US 2006/0268770 A1    Nov. 30, 2006

(30) Foreign Application Priority Data

May 30, 2005   (EP) ..................................... 05104607

(51) Int. Cl.
*H04W 4/00* (2009.01)
*H04L 12/28* (2006.01)
*H04B 7/00* (2006.01)

(52) U.S. Cl. ...... 370/338; 370/351; 455/41.2; 455/435.2

(58) Field of Classification Search .................. 370/328, 370/338, 351; 455/41.2, 41.3, 435.2; 340/539.1, 340/539.11, 539.16, 539.17, 539.19, 539.22, 340/539.23, 539.26, 539.3, 3.1, 3.2, 3.21, 340/500, 501, 505, 10.1, 10.2, 10.3
See application file for complete search history.

(56) References Cited

U.S. PATENT DOCUMENTS

| | | | | |
|---|---|---|---|---|
| 5,473,602 A * | 12/1995 | McKenna et al. | ............. | 370/256 |
| 5,574,860 A * | 11/1996 | Perlman et al. | ............... | 709/220 |
| 5,974,236 A * | 10/1999 | Sherman | ........................ | 709/221 |
| 6,744,740 B2 * | 6/2004 | Chen | ............................. | 370/255 |
| 7,020,701 B1 * | 3/2006 | Gelvin et al. | ................. | 709/224 |
| 7,119,676 B1 * | 10/2006 | Silverstrim et al. | ........... | 340/531 |
| 7,433,673 B1 * | 10/2008 | Everson et al. | ............. | 455/404.1 |
| 7,453,865 B2 * | 11/2008 | Lauer et al. | ..................... | 370/351 |
| 2002/0097732 A1 * | 7/2002 | Worster et al. | ................ | 370/408 |
| 2003/0063585 A1 * | 4/2003 | Younis et al. | ................. | 370/331 |
| 2003/0179742 A1 | 9/2003 | Ogier et al. | | |
| 2004/0018839 A1 | 1/2004 | Andric et al. | | |
| 2004/0028023 A1 * | 2/2004 | Mandhyan et al. | ........... | 370/351 |
| 2004/0081127 A1 * | 4/2004 | Gardner et al. | ............... | 370/338 |
| 2004/0240474 A1 * | 12/2004 | Fan | ................ | 370/475 |
| 2005/0099974 A1 * | 5/2005 | Kats et al. | ..................... | 370/328 |
| 2006/0227729 A1 * | 10/2006 | Budampati et al. | ........... | 370/278 |
| 2007/0115827 A1 * | 5/2007 | Boehnke et al. | ............. | 370/236 |

FOREIGN PATENT DOCUMENTS

| WO | 9946899 | 9/1999 |
|---|---|---|
| WO | WO 99/46899 | 9/1999 |

* cited by examiner

*Primary Examiner* — Christopher M Brandt
(74) *Attorney, Agent, or Firm* — Brake Hughes Bellermann LLP (57) ABSTRACT

A mobile node selects one or more network nodes of a network. Each network node of the network is communicatively coupled to a further network node of the network. The mobile node includes a communication unit configured to send a selection message that is receivable by a network node, the selection message including an identifier of the mobile node and a unique identifier of a current selection and the selection message being configured to select the one or more network nodes.

38 Claims, 8 Drawing Sheets

SELECTION OF NETWORK NODES OF A NETWORK

CLAIM OF PRIORITY

This application claims priority under 35 U.S.C. §119 to European Patent Application Number: 05104607.6, filed on May 30, 2005, the entire contents of which is hereby incorporated by reference.

TECHNICAL FIELD

This description relates generally to the field of electronic data processing and more particularly to the administration of network nodes.

BACKGROUND

Network nodes of a network can be communicatively coupled to further network nodes of the network. Nodes that are communicatively coupled are able to exchange a message in any one of the two directions. A coupling of the nodes may be wireless or with wires. A node of the network may be directly coupled only to one or more neighboring nodes. However, the nodes may provide routing functionality that allows for routing of messages from a first node to a second node by traversing directly coupled nodes in between the first and second node.

The network may furthermore include a gateway node that can send a message from one of the nodes to an application device, for example an application program running on a computer system. The application device may receive the messages, analyze them, and report a result to an administrator of the network. The application device may further send control messages to control the network nodes. The gateway node receives such a control message, and the control message is then routed to the one or more nodes to which the control message is addressed.

The network nodes may be used for different purposes. For example, each network node may include a sensor unit. The sensor unit may also be an external device to which the node is coupled. The sensor unit may have a function of receiving specific signals that are reported to the application device by using the network nodes. The signals may be, for example, usable to measure a temperature of the environment. In a specific example, the sensor unit may be used for an exchange of a message between coupled nodes. In an example, the nodes may be configured to receive radio frequency signals. The nodes may include, for example, a reader of radio frequency identifier transponders which are within a specific distance. In the example, a node is configured to transmit radio frequency signals that are receivable by neighboring nodes, that is, coupled nodes. The radio frequency signals represent the message and the nodes can process the message, for example by initiating a transmission of the message in the form of radio frequency signals to further coupled nodes.

In a further example, the sensor unit may be a smoke detector. In the further example, the sensor unit is coupled to one node and via the one node the network is used for reporting a result of the smoke detector as a message to the application device. The nodes that are coupled to smoke detectors, for example, may exchange radio frequency signals which are not receivable by the smoke detectors.

The number of the sensor units and the nodes of the network may be large, that is, the network can be large. The number of the sensor units of a large building, for example, motion detectors, may be large and accordingly the number of the nodes is large in case that each sensor unit is coupled to one node of the network. An administration of the sensor units includes maintenance of the sensor units and of the nodes of the network and this is demanding for a large network.

SUMMARY

The maintenance the nodes of the network may include selecting one or more nodes of the network according to a selection condition. The selection condition may vary depending on specific circumstances. The selected one or more nodes may, for example, then be checked for their communication behavior. In a further example, the sensitivity of the sensor units included in the selected network nodes may be checked or be readjusted. Furthermore, the (selected one or more nodes may be modified to comply with a special requirement.

It is desirable to provide means for selecting the one or more nodes according to the selection condition.

A first implementation addresses a mobile node that is able to communicate with a network node, that is, to send a selection message to the network node. The mobile node is applicable to select network nodes according to selection conditions with a location dependent aspect. The mobile node is portable and easy to apply for typical selection conditions. Using the mobile node requires low bandwidth of the network because a number of required messages is small. Furthermore, using the mobile node has low impact on an operation of the network.

A second implementation addresses the network of nodes including a node that is able to receive and process the selection message from the mobile node. Using the node of the network according to the second embodiment is cost efficient because the node may use units that are required for coupling to further nodes of the network. Therefore, the node may not require further hardware units for receiving and processing the selection message. Furthermore, receiving the selection message provides a direct and easy check of an ability of the node to receive messages.

A third implementation addresses an application device that is coupled to the network of nodes and that is able to process a reporting message from a selected network node. The application device is cost efficient because hardware and communication functionality of the network node and the application device may be used to gather required data from a selection. The application device provides a fast way to gather the required data. Applying the application device requires also low bandwidth from the network.

A fourth implementation addresses a mobile application device for receiving data including one or more identifiers of the selected nodes. The mobile application device is portable and can be used together with the mobile node. Therefore, the mobile application device is applicable to receive the data at a location where the data are required. The mobile application device allows for a fast and safe operation of the selection of the nodes because the mobile application device may give a confirmation of a successful completion. Features of the fourth embodiment are disclosed in claim 22.

A fifth implementation addresses a system with components including the mobile node, the network of the nodes, and the mobile application device. Accordingly, using the system is desirable for reasons that are valid for the components of the system. Features of the system are disclosed in claim 27.

A sixth implementation addresses a method for selecting the network nodes. The method includes method steps that are executed by the mobile node, the network node, and an external device, that is, the application device or the mobile application device. Accordingly, applying the method is desirable for reasons that are valid for the mobile node, the network node and the external device.

DETAILED DESCRIPTION

The following examples and descriptions are used to illustrate various implementations and do not limit the scope of the invention.

Figure 1:
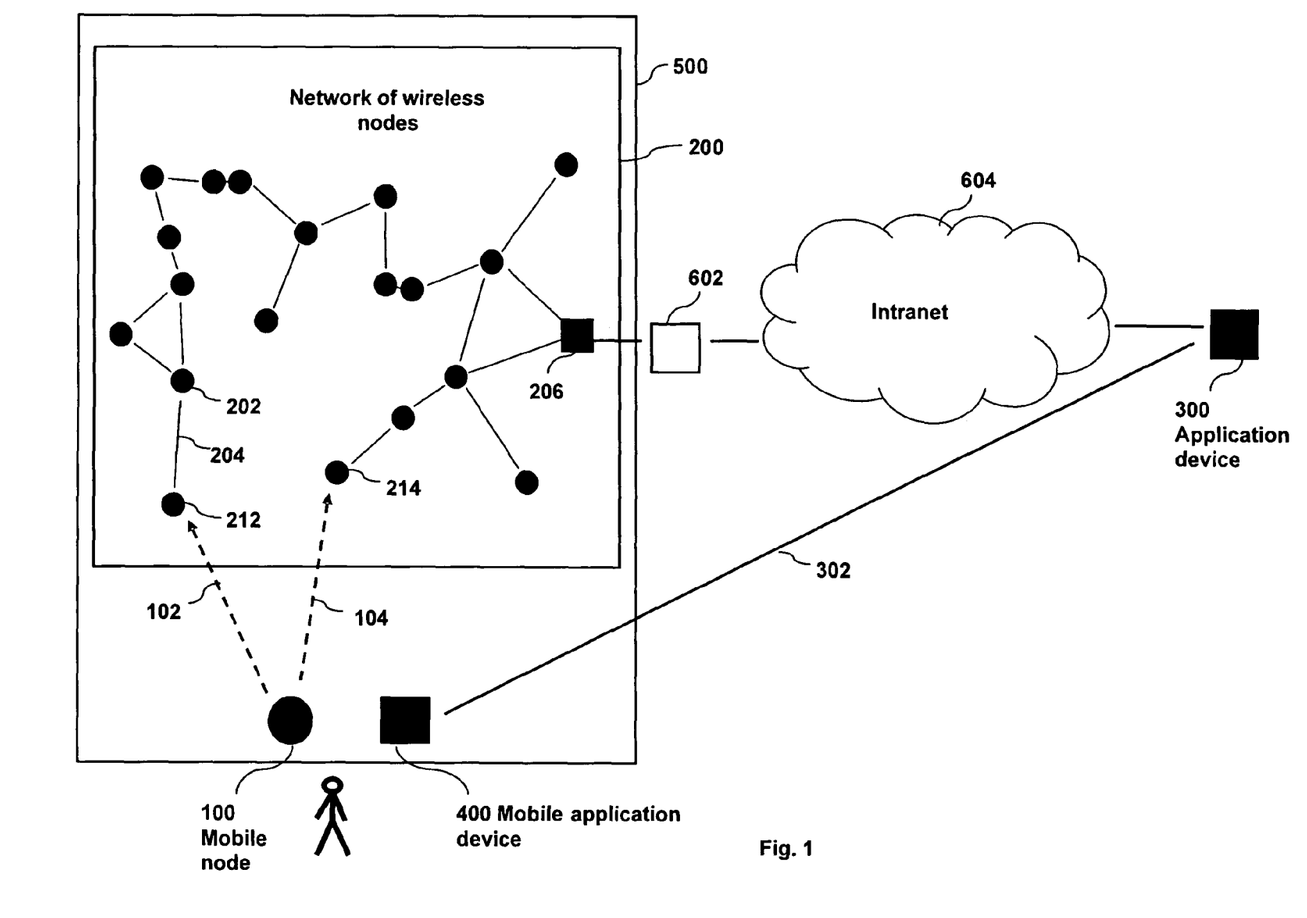
FIG. 1 is a schematic diagram of a network of nodes.

As shown in FIG. 1, there is a mobile node 100, a network of wireless nodes 200, an application device 300, and a mobile application device 400. Furthermore, the mobile node 100, the network 200, and the mobile application device 400 can be considered as components of a system 500. In a further example, the system may also include the application device 300. Lines between elements of the figure represent a communicative coupling between the elements, that is, a message can be exchanged in both of the two directions between the elements. Arrows between further elements represent a one way communication, that is, a transmission of a message in an indicated direction.

A user of the system 500 may desire to select a set of network nodes from the network 200. The network 200 is a network of wireless nodes that are communicatively coupled for example by exchanging radio frequency signals. Receiver units of nodes are configured to receive the radio frequency (RF) signals from a communication unit of a coupled node, that is, a radio frequency transmitter of the coupled node. In a further example, the communication unit and the receiver unit may be integrated in a single unit. In a further network example the nodes may be coupled by wires and a receiver unit of a node is configured to receive electrical signals over the wire from a communication unit configured to generate the electrical signal. In the figure, the user may desire, for example, to check that the receiver units of a set of the nodes are sufficiently sensitive to detect the RF signals of a transmitter, that is, a communication unit of the mobile node under specific circumstances. An example of a specific circumstance is that the transmitter is in a specific location of a building, for example, an entrance gate of a storage room. For example, the user may check if a future node that is planned to be installed in the specific location can be expected to be coupled to the network. The user carries the mobile node 100 together with the mobile application device 400 to the specific location of the building. The user may use an activation means of the mobile node, for example, the pressing of an activation button to activate a communication unit of the mobile node. Following an activation of the communication unit of the mobile node the communication unit may emit RF signals of a strength that corresponds to the strength of the radio frequency transmitter of the future node. The signals of the mobile node represent a selection message. In the example, the mobile node repeats a transmission of the selection message several times to make sure that nodes for which the selection message is receivable receive the selection message. In a further example, the mobile node may repeat transmissions of further selection messages with further current selection identifiers. This allows for a comparison of reactions to different selection messages with different current selection identifiers. Such a comparison may be useful to find out how reliably the nodes receive the different selection messages under identical circumstances.

The selection message includes an identifier of the mobile node and a unique identifier of a current selection. The unique identifier may for example be a globally unique identifier (GUID). In a further example, the unique identifier may be a number selected randomly from a large range of numbers so that a probability that two unique identifiers are identical is very low. Furthermore, the selection message is configured to select the set of nodes. Due to the identifier of the mobile node messages triggered by the selection message can be related to the mobile device. Accordingly, the identifier of the current selection allows for a relation between the triggered messages and the selection message. In case the user of the mobile node changes the location and activates again the communication unit, a subsequent selection message can include a further current selection identifier. The set of nodes is selected according to a selection condition. The selection condition may for example be that network nodes that receive the selection message are the network nodes of the set. There may be further selection conditions which are illustrated in some of the following figures.

The mobile node 100 can successfully establish a one-way communication 102 to node 212 and a further one-way communication 104 to node 214. Node 212 and node 214 can be part of the network 200 of wireless nodes. The network can include further network nodes and a gateway node 206. The gateway node 206 can be configured to receive messages from any of the network nodes and to transmit the received messages to an application device 300. Node 212 and node 214 can receive the selection message through the receiver unit and process the selection message in a processing unit of the nodes. The processing unit can be configured to create a reporting message including the mobile node identifier and the current selection identifier of the received selection message. Furthermore, the reporting message can include an identifier of the network node, which enables a subsequent identification of the node that has created the reporting message. Node 212 and node 214 can include a communication unit that is configured to route the reporting message to a specific node. Such a routing functionality may be a standard functionality of the network, which is also applicable to the reporting message. The communication unit also can be configured to route a further reporting message that has previously been created by a processing unit of a further network node. The specific node can be configured to send the reporting message and the further reporting message to an external device. In the example, the specific node can be the gateway node 206 and the external device can be the application device 300. In the example for the wireless sensor network, the receiver units can be configured to receive the selection message from the mobile node and the further reporting message from the coupled nodes. Furthermore, the communication unit can be configured to send the reporting message and the further reporting message so that both of the messages can be receivable by the receiver unit of the coupled node.

The selection message received by node 212 and node 214 need not include a selection condition. However, the selection condition can include a condition that nodes that receive the selection message are member of the set of selected nodes. As shown in FIG. 1, the nodes of network 200 are configured to the condition. Accordingly, node 212 and 214 are members of the set, and therefore each one creates a reporting message.

The communication unit of node 212 can be coupled to a receiver unit of node 202 via a coupling 204. Node 202 can receive the reporting message of node 212 as a further reporting message. The communication unit of node 202 can route the further reporting message to the gateway node 206. Node 202 need not fulfill the selection condition of the example, and therefore node 202 can abandon the creation of a reporting message. In the example the nodes of the network 200 can be configured to fulfill a further condition that the current selection identifier of the selection message has been received for a first time. Therefore, if node 212 receives a plurality of selection messages with an identical selection identifier, node 212 only creates a reporting message for the first received selection message of the plurality. In this way routing of redundant reporting messages through the network can be reduced.

The gateway node 206 can receive the further reporting messages from node 212 and node 214. The gateway node 206 sends the further reporting messages to a gateway 602 to which it is communicatively coupled. In the example, the gateway 602 is configured to convert messages from the gateway node to a format so that the messages can be sent through an intranet 604 to the application device 300. In a further example, the messages may be sent also through the Internet. Furthermore, the gateway node 206 may be configured to convert the messages and send them over the intranet 604 so that the gateway 602 is not required.

The application device 300 can be configured to receive the reporting messages sent from the gateway node. The application device may be, for example, a computer system executing an application program. The application program can provide statements to configure the computer system according to required features of the application device. The application device may also be a backend system used to control the nodes of the network. Controlling the nodes may include sending control messages to the nodes and receiving response messages from the nodes. The application device may also send reconfiguration messages to the nodes, which modify a configuration of the nodes, for example, a sensitivity level of a sensor unit of a selected node. The application device may further send software update messages that update a software program running on the nodes.

The application device 300 can be further configured to create a status message. The status message can include one or more identifiers of network nodes that have created the reporting message with the identical current selection identifier. In the figure, the application device can receive the reporting messages from node 212 and node 214. Both reporting messages can have the identical current selection identifier. Therefore, the application device can create the reporting message with an identifier of node 212 and an identifier of node 214. The status message may be displayed or offered for display to a user of the application device 300. Furthermore, the application device can have a communication unit that is configured to send the status message to the mobile application device 400 using a wireless connection. Accordingly, the application device can establish a communication 302 to the mobile application device 400 using a mobile transmission standard, for example, a Global System for Mobile Communications (GSM) standard, a General Packet Radio Service (GPRS) standard, or a Universal Mobile Telecommunications System (UMTS) standard. The status message may also be transmitted using a Wireless Local Area Network (WLAN) connection between the application device and the mobile application device. In a further example, the application device may send the status message to the gateway node so that the status message is routed to a network node and sent from the network node to the mobile node. The mobile node may then transmit the status message to the mobile application device 400.

The mobile application device 400 may be a computer system configured to execute a mobile application program. The computer system may be for example a laptop or a personal digital assistant (PDA). The mobile application device 400 has a communication unit configured to receive the status message created by the application device 300. Furthermore, the mobile application device has a display unit configured to display data including the identifiers of the selected network nodes, that is, node 212 and node 214 to a user of the mobile application device. At a request of the user the display unit may further display data including descriptions where the selected network nodes 212 and 214 are located. This may be useful in case that the user desires, for example, to exchange a power supply of a selected network node or the sensor unit of the selected node. Furthermore, the user may desire to inspect the selected network node closely and to change a switch setting of the selected node or the sensor unit of the selected node. In a following figure (see FIG. 6), a time sequence of communication activities is illustrated for an implementation including the mobile node 100, the network 200, the application device 300, and the mobile application device 400.

In a further example, the communication unit may be configured to receive from the mobile node 100 any one of the following messages: an activation message, the selection message, and the status message. The activation message can have data representing the activation of the communication unit of the mobile node. Accordingly, the mobile node can have an interface unit configured to send the respective messages to the mobile application device. In the further example, the activation message can inform the mobile application device that the user desires to select the network nodes. In a yet further example, the selection message and the reporting message may be provided so that the mobile application device can create a self status message without depending on the application device. In a following figure (see FIG. 7), a time sequence of communication activities is illustrated for an implementation including the mobile node 100, the network 200, and the mobile application device 400. Alternatively, the status message from the application device may be sent through the mobile node to the mobile application device. In a further alternative example, the communication unit of the mobile node may receive the status message from the application device and indicate the receiving of the status message to the user. The user then knows that the selection of the nodes has been successful.

Figure 2:
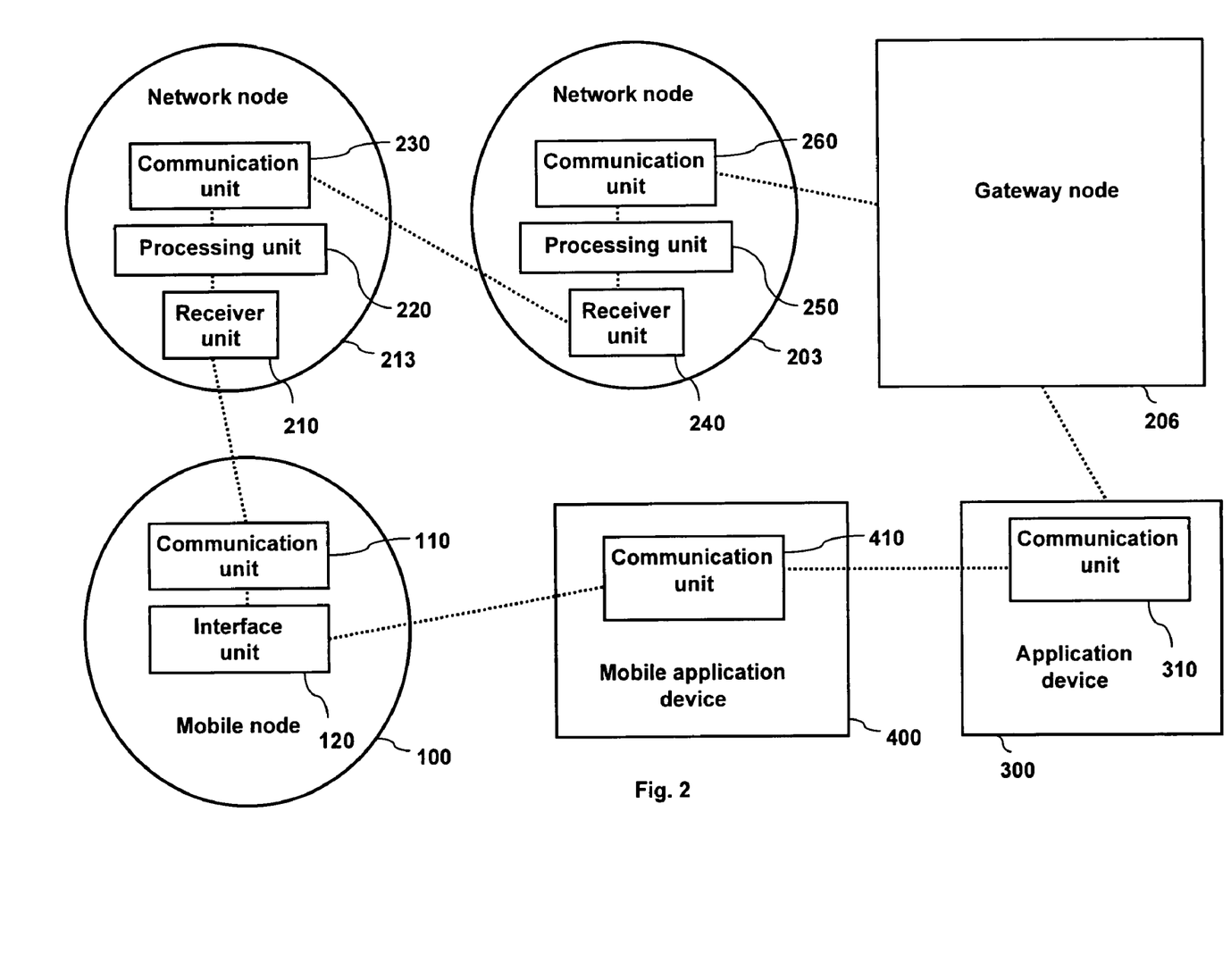
FIG. 2 is a schematic diagram of components of nodes in a network of nodes.

FIG. 2 illustrates selected details of a further implementation that includes units of the mobile node 100, network nodes 203 and 213, the application device 300, the mobile application device 400, and message transmissions between the units. Compared to a previous figure (see FIG. 1), message transmission is shown between the mobile node 100 and the mobile application device 400. Furthermore, compared to the FIG. 1, dotted lines between elements represent the message transmissions between the elements in one or in two directions. The mobile node 100 includes a communication unit 110 and the interface unit 120. The communication unit 110 of the mobile node is coupled to the interface unit 120 of the mobile node so that the activation of the communication unit 110 can be transmitted to the interface unit 120. In a further example, the communication unit 110 of the mobile node may transmit the status message received from a communication unit of a coupled network node to the interface unit 120. In the figure, the interface unit 120 of the mobile node can be configured to send messages to a communication unit 410 of the mobile application device 400. In the example, the communication unit 110 can send the selection message that is received by a receiver unit 210 of a network node 213. The message can be transmitted from the receiver unit 210 to a processing unit 220 for verifying that the network node fulfills the selection condition and to create the reporting message according to the result. In the example, the selection condition is that network nodes that receive the selection message are selected. In the example, the reporting message is created and transmitted to a communication unit 230 of the network node 213. The communication unit 230 of the network node 213 can send the reporting message to a receiver unit 240 of the coupled network node 203. The receiver unit 240 of the coupled network node 203 can transmit the received reporting message as the further reporting message to a processing unit 250 of the coupled network node 203. The processing unit 250 of the coupled network node 203 can transmit the further reporting message to a communication unit 260 of the network node 203 that again sends the further reporting message to a coupled node. In a further example, a further selection message may include a selection condition, and the communication unit 230 of the network node 213 may further send the further selection message to the receiver unit 240 of the network node 203. In the further example, the processing unit 250 can further verify that the network node 203 fulfills the selection condition of the further selection message. However, in the further example, the network node 203 may not fulfill the selection condition and accordingly no reporting message is created by the processing unit 250. Therefore, also in the further example, the communication unit 260 of the network node 203 can send the further reporting message and does not send a reporting message with an identifier of the network node 203.

As shown in FIG. 2, the further reporting message can be received by the gateway node 206. The gateway node 206 may also have a receiver unit and a processing unit. The gateway node 206 sends the message to a communication unit 310 of the application device 300. In the example, the application device 300 creates the status message, and the communication unit 310 sends the status message to the communication unit 410 of the mobile application device 400. In the example, the mobile application device 410 has received the activation message from the mobile node 100 and the status message from the application device 300. Therefore, the mobile application device 400 may wait for a specific period of time after receiving the activation message until completing the selection of the network nodes. Following completion of the selection the mobile node may start with a processing of the received status messages. Furthermore, the mobile node may not process further status messages received after completing the selection and may also indicate to the user that the selection has been completed. The user may then start with a new selection of network nodes without waiting further and with a feed back that the selection can be considered as completed.

Figure 3:
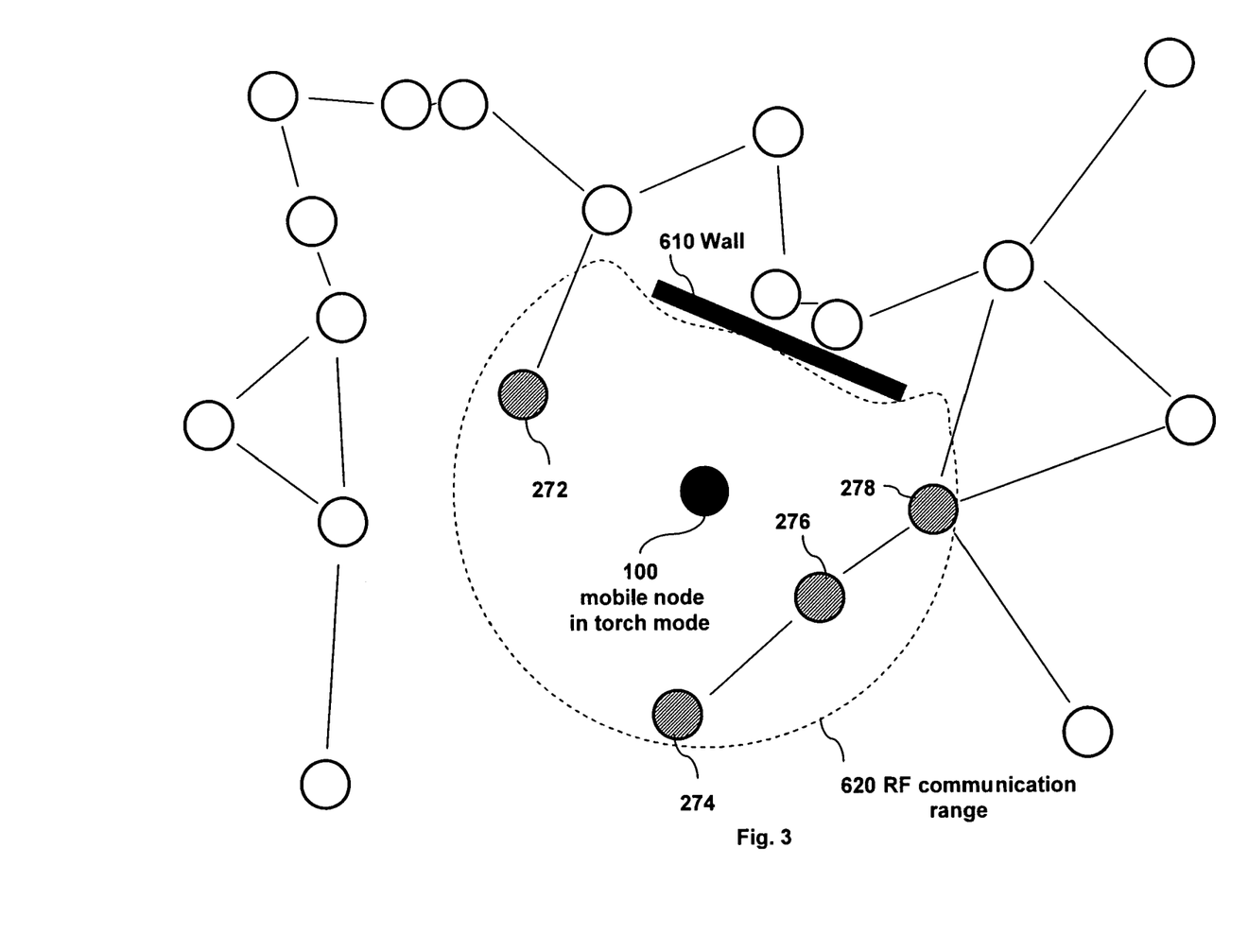
FIG. 3 is a schematic diagram of a selection condition in a radio frequency network of nodes.

FIG. 3 illustrates results of a first selection condition in a RF network. As shown in the figure, the RF network has nodes that are coupled by exchanging RF signals encoding a message. The mobile node 100 also sends the selection message as RF signals. The first selection condition is that network nodes that receive the selection message are selected. In the example, the first selection condition is not described in the selection message because it is a default selection condition that is applied in case that no further selection condition is specified. The mobile node 100 sends the selection message by emitting RF signals of a specific strength. The strength of the RF signal may be adjustable and the user of the mobile node may select the specific strength so that it matches the strength of a specific RF transmitter. In the example, the specific RF transmitter is attached to products that are moved through the location of the mobile node that is located in the figure. The user may desire to check that the specific transmitter emits signals that are receivable by more than one network node. In case that few network nodes receive the selection signal the user may reprogram the network nodes. Reprogramming the network nodes may include sending further selection messages with greater signal strength and increasing the sensitivity of the network nodes that received the further selection message. Reprogramming may include sending programming messages from the application device or from the mobile node to the selected nodes. In a further example, the user may desire to compute an average temperature from the temperature values measured by the sensor units of the selected nodes in the proximity of the user.

The mobile node 100 can emit signals in the specific strength, and due to the first selection condition the mobile node can be in a "torch mode." The torch mode signifies that the nodes that receive the signals are selected. A RF communication range 620 limits an area in which the emitted signals are strong enough to be receivable by the network nodes. The area is a three-dimensional space but in the figure a two-dimensional illustration is displayed. The illustration neglects differences in the height between the mobile node and the network nodes but is useful for illustrating the torch mode. The signal strength decreases with increasing distance from the mobile node. In a space without obstacles and assuming optimal RF conditions, the range 620 is approximately a circular arc because the mobile node emits the signals evenly without a directional preference. In case that the RF signals encounter an obstacle such as a wall 610 the signal strength may be reduced much faster so that the range 620 excludes the wall 610 and an area behind the wall 610. In the example, network nodes 272, 274, 276, and 278 are within the area limited by the range 620 and accordingly the network nodes are selected and create a reporting message.

Figure 4:
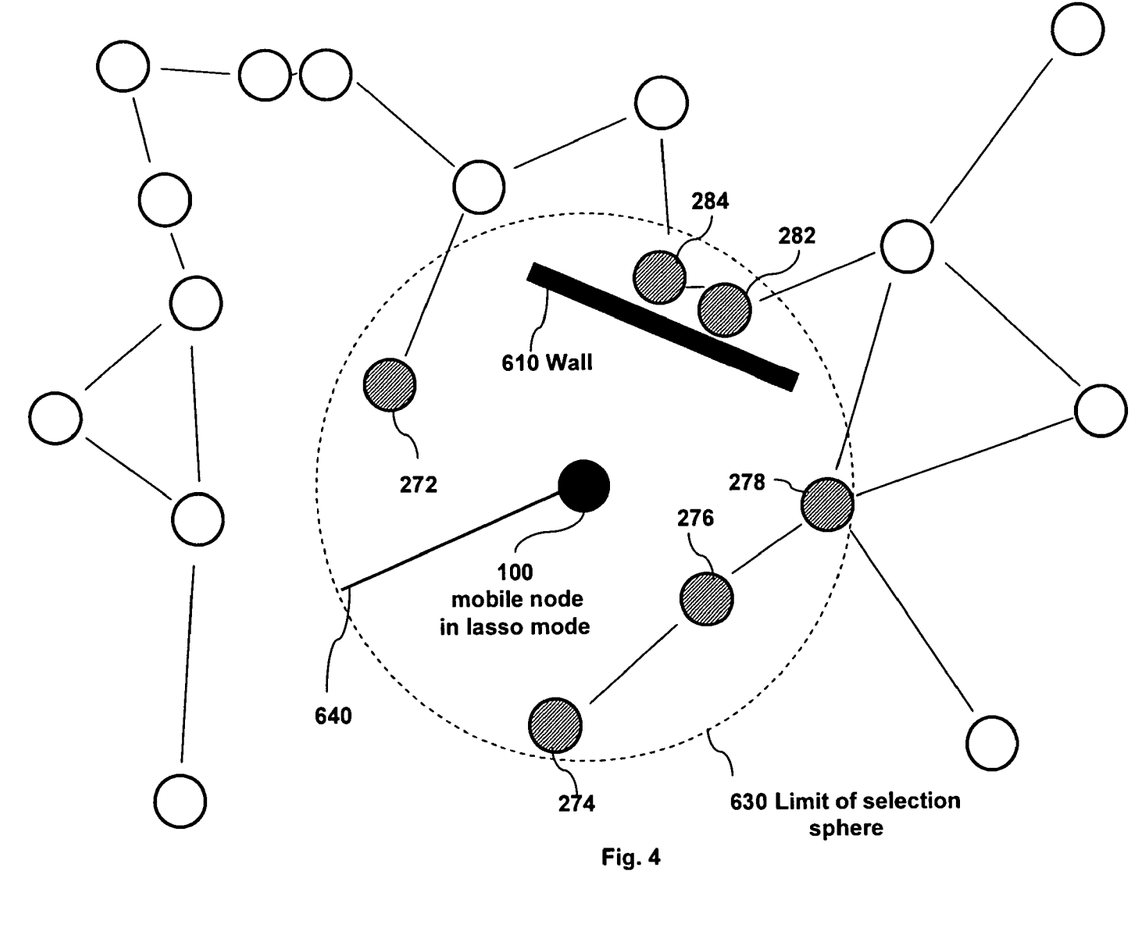
FIG. 4 is a schematic diagram of a selection condition in a radio frequency network of nodes.

FIG. 4 illustrates results of a second selection condition in a radio frequency network. Lines between nodes of the figure represent a communicative coupling between the nodes. The mobile node 100 can send the selection message as in the previous figure. In the example, the selection message can include also the second selection condition and accordingly the first selection condition is not applicable. In a further example, the network nodes may receive the second selection condition from the application device coupled to the network. The selection message can further include an identifier of a position of the mobile node and an identifier of a radius of a selection sphere. The selection sphere has a center at the position of the mobile node, and the selection sphere can be applicable to select a set of network nodes that are within a distance of the radius from the mobile node. The position of the mobile node may be known, for example, from a global positioning system (GPS) unit that can be connected to the mobile node. In a further example, the mobile node may be connected to a device with a user interface that provides a map of the environment to the user and an input means for the user to specify the position on the map. The user interface may for example be a touch screen. Furthermore, the user may be provided with a means to specify the radius of the selection sphere, for example by turning a specific button on the mobile node. The second selection condition is the condition that the position of the network node is within the selection sphere. In the example, the network node is required to have access to its position, for example, by accessing a memory unit of the network node. In the figure, a limit 630 of the selection sphere is shown in a two-dimensional illustration. The mobile node sending the selection message with the second selection condition is in a lasso mode. In the lasso mode the strength of the signal conveying the selection message can vary. The signal strength is required to be large enough that at least one network node can receive the selection message. The set of the selected nodes does not depend on which node receives the selection message from the mobile node. To apply the second selection condition the processing unit of the network nodes can be configured to access an identifier of a position of the network node. The processing unit of one network node may verify, for example, the second selection condition by computing the distance between the position of the one network node and the position of the mobile node and by checking that the distance is smaller than the radius of the selection sphere. In case that the second selection condition is fulfilled and that the reporting message is created, the reporting message is routed to the gateway node. The communication unit of the network node can be further configured to send the selection message to a further network node coupled to the one network node. In the example, the reporting node sends to all network nodes coupled to the one network node. Each one of the coupled network nodes uses the selection message to verify the second selection condition. Independently of the result of verifying, each one of the coupled network nodes sends the selection message to the further network nodes coupled to the one of the coupled network nodes, unless the one network node has previously sent a previous selection message with the identical selection identifier. In this way the network is flooded with the selection message. Consequently, each of the network nodes of the network is able to verify the second selection condition and to create according to the result the reporting message. The network may also provide a further, possibly optimized flooding mechanism that may be applied in a further example of the network.

In the figure, there are network nodes 272, 274, 276, 278, 282, and 284 within the selection sphere. The wall may reduce the range of the RF signal, but because the network is flooded with the selection message, also network nodes 282 and 284 receive the selection message and can verify the second selection condition. In a further example, a further selection message may be sent with the second selection condition and a larger radius of a larger selection sphere. Comparing a result of further network nodes selected by the further selection message and the result of the node selected by the selection message, the user can see how many nodes are within the larger selection sphere that are not within the selection sphere.

Figure 5:
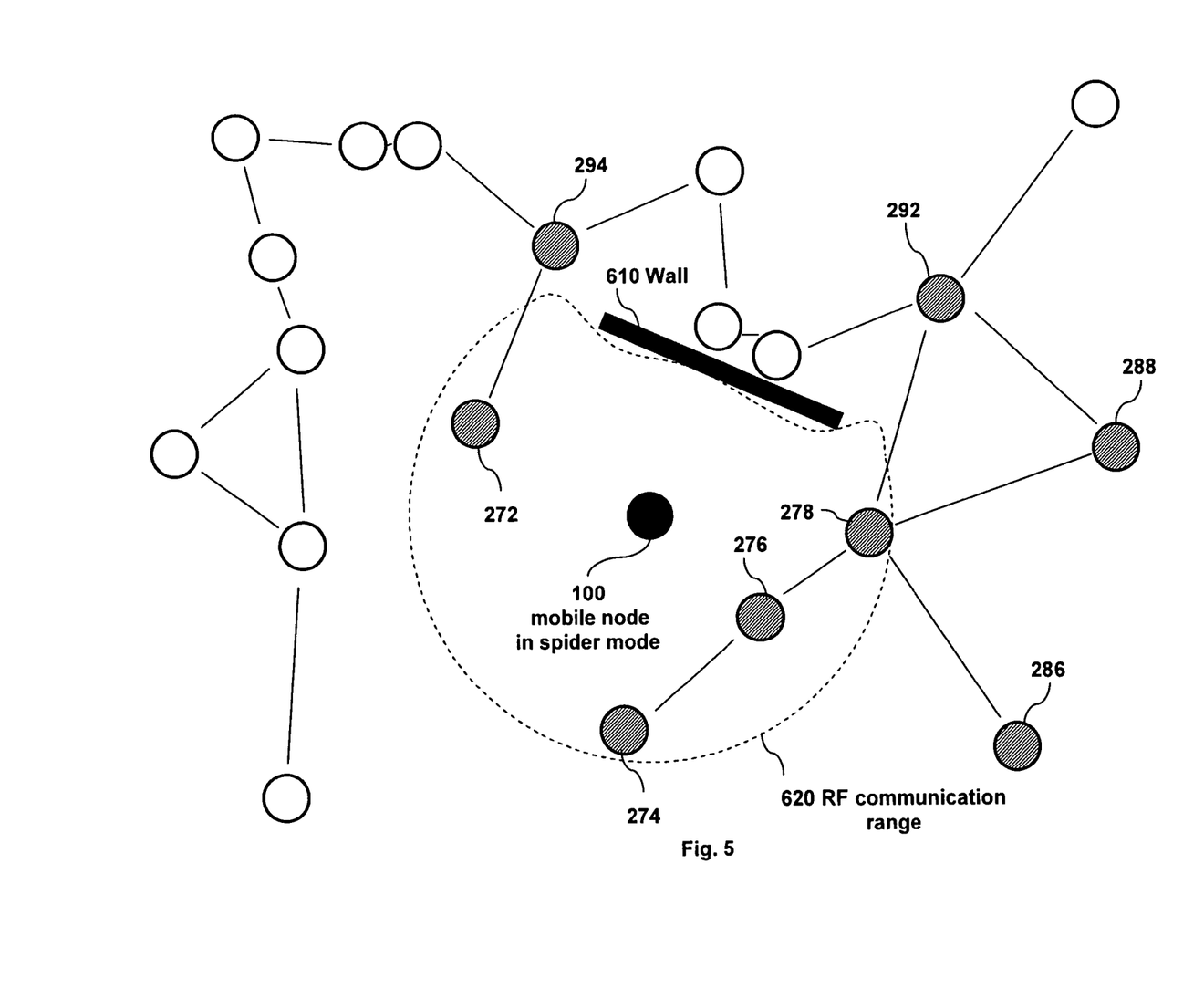
FIG. 5 is a schematic diagram of a selection condition in a radio frequency network of nodes.

FIG. 5 illustrates results of a third selection condition in a radio frequency network. In the example, the selection message further includes a selection count. The selection count indicates further nodes that are selected in addition to first nodes that received the selection message from the mobile node and that are selected. For sending the selection message with the third selection condition the mobile node is in a spider mode. The third selection condition can be described by selecting the first nodes that are also selectable by the first selection condition and further selecting the further nodes that are connected to the first network. The further nodes are connected to the first nodes through a number of intermediate nodes, wherein the number is smaller than the selection count. For the third selection condition, the processing unit of the nodes is further configured to create a new selection message. The new selection message can include the identifier of the mobile node, the identifier of the current selection, and a new selection count. The processing unit can be configured to calculate the new selection count for the new selection message by reducing the selection count of the selection message by a value of one. Furthermore, the communication unit of the node can be further configured to send the new selection message to a further network node coupled to the network node. In the example, the selection message has the third selection condition with a condition that the new selection count is greater than a threshold value of zero. Furthermore, the third selection condition can require that the new selection count be greater than a previous new selection count of a previous new selection message created for an identical selection identifier. The previous selection message can be a selection message that has been received previously by the receiver unit of the node. The comparison of the new selection count with the previous new selection count can reduce a number of selection messages being sent in the network. The reason is that the sent selection messages are not applicable to select a node that has not been selected due to the previous selection message sent previously.

In FIG. 5, the selection count of the selection message sent by the mobile node has a value of two. The nodes 272, 274, 276, and 278 are within the RF communication range 620 and receive the selection message from the mobile node. Therefore, each one of the nodes 272, 274, 276, and 278 is selected and creates a new selection message including a new selection count with a value of one. The new selection messages are received by nodes 286, 288, 292, and 294. The nodes 286, 288, 292, and 294 are selected because each one receives the new selection message with a new selection count of one. However, each one of the nodes 286, 288, 292, and 294 computes a further new selection count with a value of zero. A further new selection message with the further new selection count is not applicable to select any further nodes. Therefore, the nodes 286, 288, 292, and 294 may for example not send the further new selection message to reduce communication load of the network.

Figure 6:
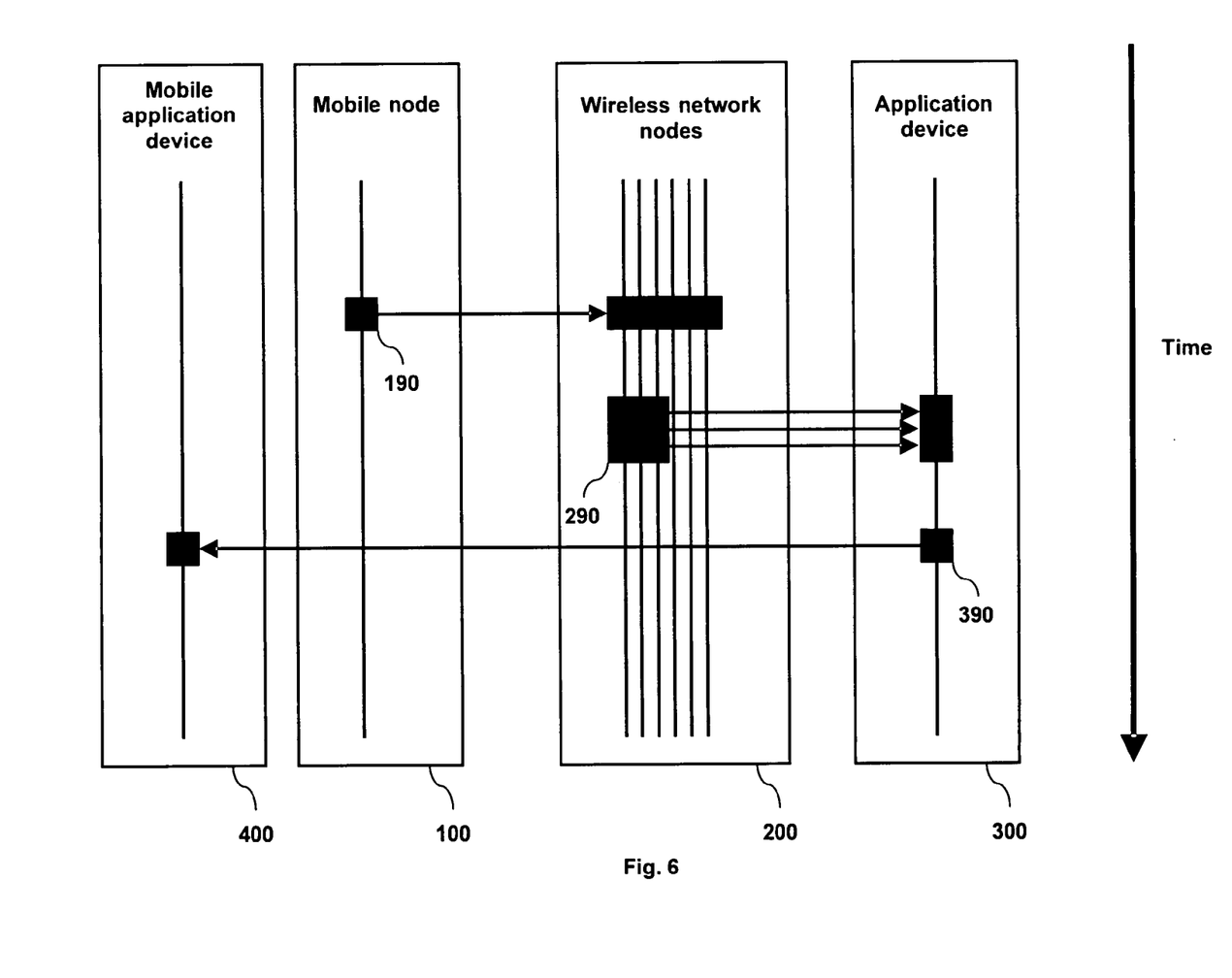
FIG. 6 is a schematic diagram of data flow in among nodes in a network of nodes.

FIG. 6 illustrates activities of implementations over a specific period of time. In the figure, the mobile node 100 sends a selection message 190 that is received by one or more network nodes of the wireless network 200. In the example, the selection message 190 is broadcast to all nodes. The selection message 190 may include, for example, the second selection condition. According to results of verifying the selection condition, a set 290 of reporting messages is routed to the application device 300. The application device 300 may wait for a specific waiting period before creating the status message 390 and send the status message to the mobile application device 400. The mobile application device 400 may then signal to the user that the status message has been received from the application device. The mobile application device may further display to the user which nodes have been selected and use the selection identifier to instruct the application device to apply commands to the selected nodes. The commands may include reprogramming instructions, update information for configuration parameters, requests of node state information, or requests of sensor readings.

Figure 7:
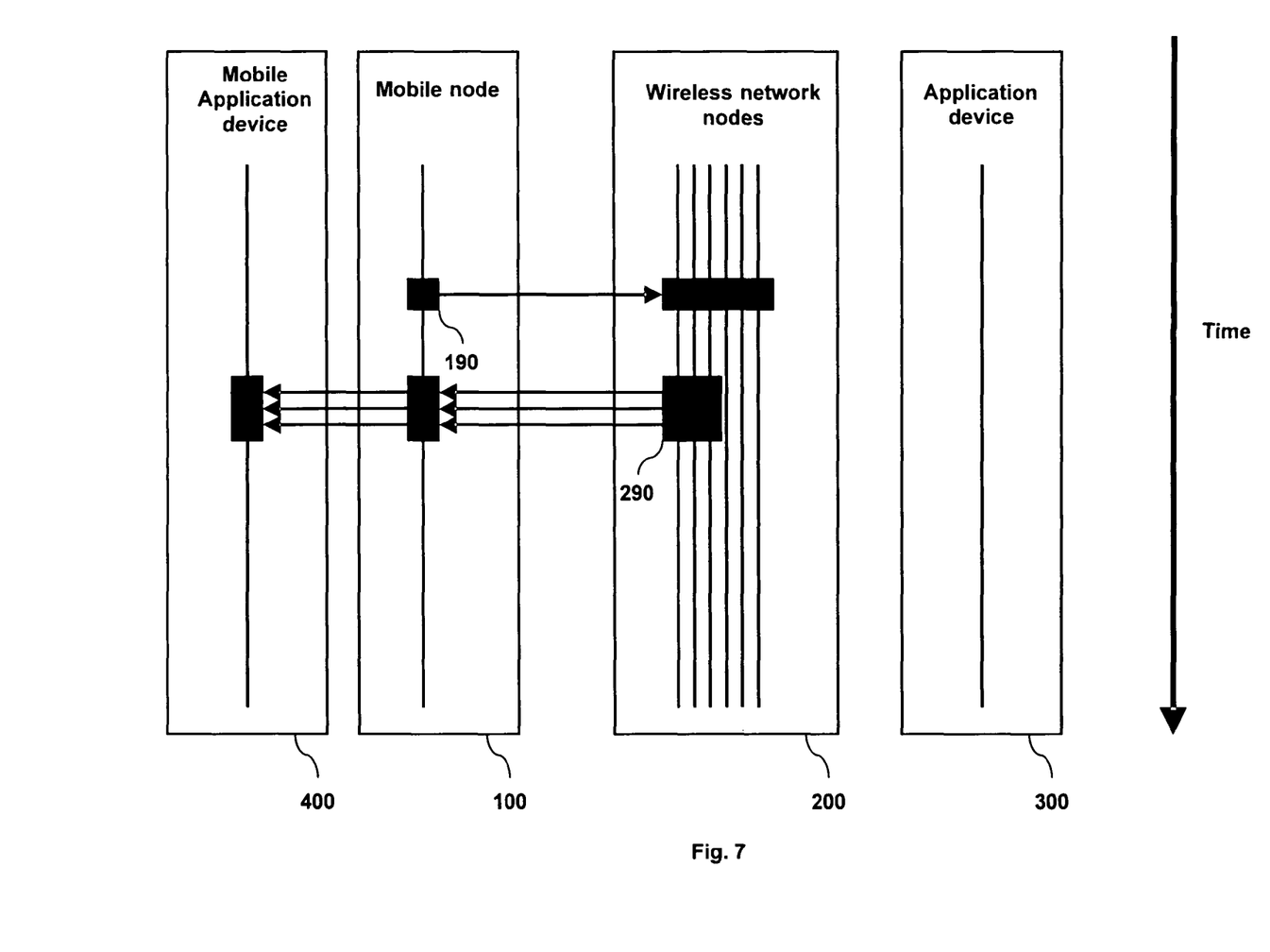
FIG. 7 is a schematic diagram of data flow in among nodes in a network of nodes.

FIG. 7 illustrates activities of further implementations over a specific period of time. In the figure, again the mobile node 100 sends the selection message 190 that is received by the one or more network nodes of the wireless network 200 and broadcast to all nodes. Each of the selected nodes can send a reporting message, however, the set 290 of the reporting messages is routed to the mobile node 100. The mobile node 100 has the communication unit required to receive the reporting messages of the selected nodes. Furthermore, the mobile node includes the interface unit to communicate the reporting messages to the mobile application device in wired or wireless way. The mobile node 100 forwards the received reporting messages to the mobile application device 400. The mobile application device may for example create the status message and present a part of the status message to the user. The mobile application device may use a selection identifier to interact with the selected nodes through the interface unit and the communication unit of the mobile node.

Figure 8:
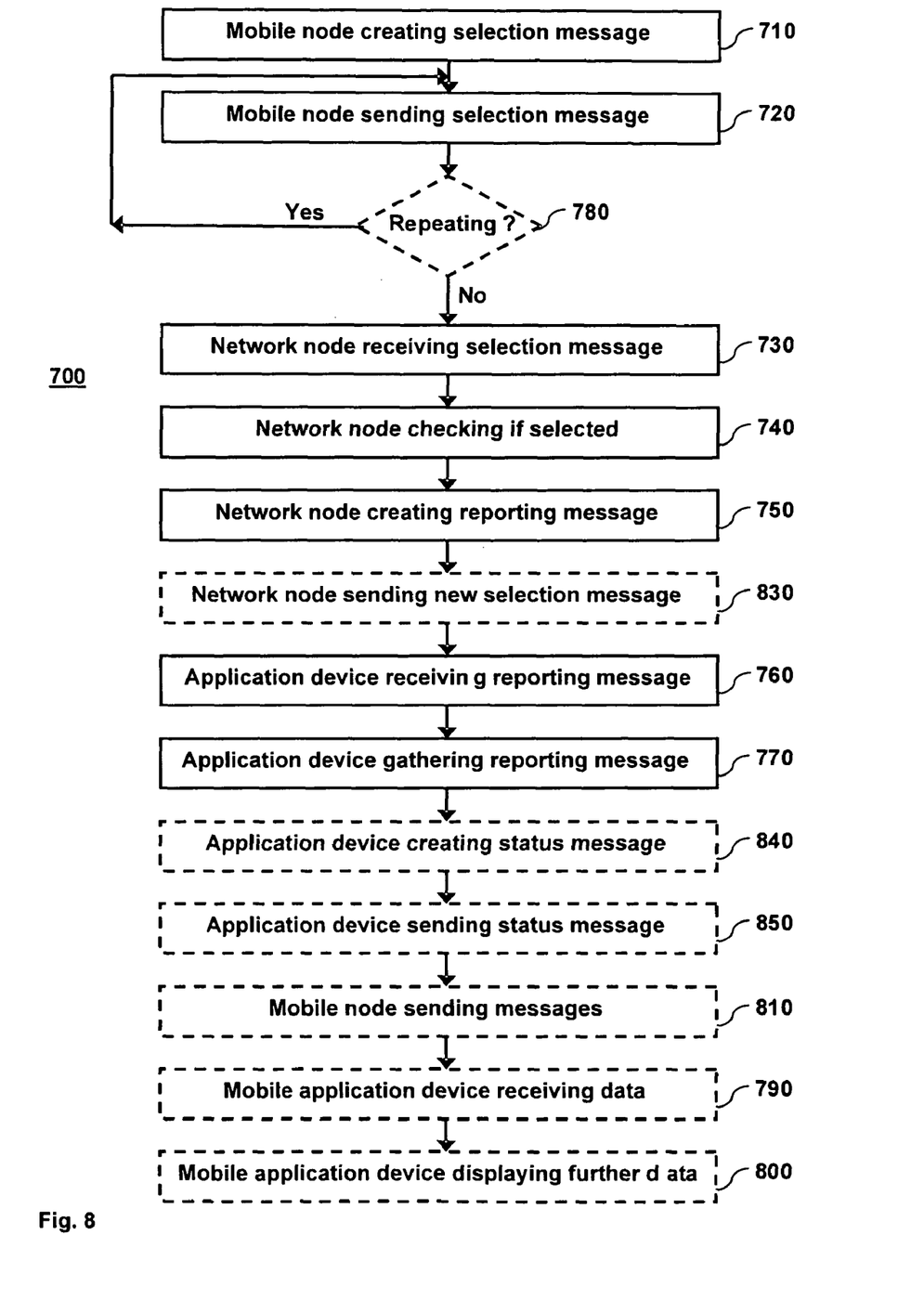
FIG. 8 is a flow chart of a method of selecting nodes in a network of nodes.

FIG. 8 illustrates a method 700 for selecting the one or more network nodes of the network 200. The method 700 includes method steps that can be executed by the mobile node 100, the network node that receives the selection message, for example 212, the application device 300 and the mobile application device 400. In the figure, optional method steps are illustrated with dashed lines and generally obligatory method steps are illustrated with solid lines.

A first step is the mobile node 100 creating 710 the selection message. A following step is the mobile node 100 sending 720 the selection message so that the selection message is receivable by the network nodes of the network. This can require that the signal be detectable by the receiver units of the network nodes and that the format can be recognized by the network nodes. In the example, next the mobile node can repeat 780 the sending 720 of the selection message several times.

Accordingly, in a following method step the network node can receive 730 the selection message, and the network node can check 740 if the network node is selected. In a further example, the method steps of the network node receiving 730 and checking 740 may be executed before the mobile node has finished repeating 780 sending the signal message for several times. In this case, the network node may ignore identical copies of the selection message. A further method step includes the network node creating 750 the reporting message with the current selection identifier in case that the network node is selected. In the example, next the network node can send 830 a new selection message to a further network node that is communicatively coupled to the sending network node. The new selection message includes the identifier of the mobile node 100, the identifier of the current selection and the new selection condition that is an example of a third selection condition. Accordingly, the selection count of the new selection condition has to be computed. The further network node verifies that the new selection condition is fulfilled and sends accordingly the further reporting message.

Next, an external device receives 760 and gathers 770 the reporting message together with further reporting messages with the identical current selection identifier. Gathering 770 the reporting message may include, for example, writing the reporting message to a memory unit and furthermore writing contents of the reporting message in a list together with a content of the further reporting message. In the example, the external device can be the application device 300. In a further example, the external device may be the mobile application device 400. In the example, the application device 300 can be communicatively coupled to the network 200, and next the application device 300 can further create 840 the status message and can send 850 the status message to the mobile application device 400 using the wireless connection 302.

In the example, next, the mobile node 100 can send 810 to the mobile application device 400 the activation message representing an activation of the communication unit of the mobile node. In a further example, the mobile node may also send any one of the following received messages: the selection message, the reporting message, and the status message. The received messages may have been received by the mobile node from a network node to which the mobile node is coupled. In the example, however, the application device has processed the reporting messages and sent directly the status message to the mobile application. Accordingly, the mobile application does not require the selection message to process the reporting messages. In the example, next the mobile application device receives 790 data including the identifier of the selected network node, that is, the status message. In a further example, the mobile node may receive the reporting messages either from the mobile node 100 or from the application device 300. The following method step includes the mobile application device 400 displaying 800 further data related to the identifier of the selected network node to a user of the mobile application device 400. The further data may include, for example, the identifier of the selected network node. It may further include a description of the selected network node that is significant to the user together with an option to display technical features of the network node.

What is claimed is:

1. A mobile node adapted for selecting one or more network nodes of a network, wherein each network node of the network is communicatively coupled to a further network node of the network, the mobile node comprising:
a communication unit configured for sending a selection message configured to select the one or more network nodes, wherein the selection message is receivable by a network node, the selection message comprising an identifier of the mobile node and a unique identifier of a current selection message and a selection condition, wherein the selection includes verifying that the selection condition is fulfilled.

2. The mobile node of claim 1, wherein the selection message further comprises an identifier of a position of the mobile node and an identifier of a radius of a selection sphere that has a centre at the position of the mobile node, the selection sphere being applicable to select a set of network nodes that are within a distance of the radius from the mobile node.

3. The mobile node of claim 1, wherein the selection message further comprises a selection count, the selection count being applicable to select a further set of network nodes that are coupled to a selected network node by traversing a number of network nodes that is smaller than the selection count.

4. The mobile node of claim 1, further comprising an activation device configured to activate the communication unit to transmit the selection message.

5. The mobile node of claim 1, wherein the communication unit is further configured to repeat a transmission of the selection message.

6. The mobile node of claim 1, wherein the communication unit is further configured to receive a message from a network node, the message comprising one or more identifiers of network nodes that comply with the selection condition.

7. The mobile node of claim 1, wherein the mobile node further comprises an interface unit configured to interface with a mobile application device, the interface unit being further configured to send to the mobile application device a message selected from the group consisting of: an activation message indicating an activation of the communication unit, the selection message, a reporting message, and a status message,
- wherein the reporting message has been received from one of the network nodes and comprises an identifier of the selected network node, and
- wherein the status message has been received from any one of the network nodes and comprises one or more identifiers of network nodes that have been selected by the selection message comprising the identifier of the current selection message.

8. The mobile node of claim 1, wherein the network is a wireless sensor network including network nodes comprising a receiver unit configured to receive messages from a coupled network node, and
- wherein the communication unit of the mobile node is configured to send the selection message so that the selection message is receivable by the receiver unit.

9. The mobile node of claim 1, wherein the unique identifier of the current selection message uniquely identifies the selection message that is configured to select the one or more network nodes.

10. The mobile node of claim 1, wherein the unique identifier of the current selection message uniquely identifies a location of the mobile node when the mobile node sends the selection message that is configured to select the one or more network nodes.

11. The mobile node of claim 1, wherein the unique identifier of the current selection message uniquely identifies a signal strength with which the mobile node sends the selection message that is configured to select the one or more network nodes.

12. A network of nodes comprising network nodes and a gateway node, each network node being communicatively coupled to a further network node and the gateway node being configured to receive messages from a set of network nodes and to transmit the received messages to an application device, a network node of the network comprising:
- a receiver unit configured to receive a selection message from a mobile node, the selection message being configured to select one or more network nodes and comprising an identifier of the mobile node, a unique identifier of a current selection message, and a selection condition;
- a processing unit configured to create a reporting message comprising the mobile node identifier, the identifier of the current selection message, and an identifier of the network node and configured to verify that the selection condition is fulfilled when the selection condition is fulfilled and to create the reporting message when the selection condition is not fulfilled; and
- a communication unit configured to route the reporting message and a further reporting message created by a processing unit of a further network node to a specific node that is configured to send the reporting message and the further reporting message to an external device.

13. The network of claim 12, wherein the specific node is the gateway node of the network and wherein the external device is the application device.

14. The network of claim 12, wherein the specific node is a network node and the external device is a mobile application device.

15. The network of claim 12, wherein the selection condition comprises a condition that the identifier of the current selection message has been received for a first time.

16. The network of claim 12, wherein the processing unit is further configured to access an identifier of a position of the network node, wherein the selection message further comprises an identifier of a mobile node position and an identifier of a radius of a selection sphere having a center at the mobile node position, wherein the communication unit is further configured to send the selection message to a further network node coupled to the network node, and wherein the selection condition comprises a condition that the position of the network is within the selection sphere that is identified in the selection message.

17. The network of claim 12, wherein the selection message further comprises a selection count, wherein the processing unit is further configured to create a new selection message comprising data of the selection message and a new selection count and to calculate the new selection count by reducing the selection count of the selection message by a value of one, wherein the communication unit is further configured to send the new selection message to the further network node coupled to the network node, and wherein the selection condition comprises a condition that the new selection count is greater than a threshold value and that the new selection count is greater than a previous new selection count of a previous new selection message created for an identical selection identifier.

18. The network of claim 12, wherein the gateway node is further configured to receive a status message from the application device, the status message comprising one or more identifiers of network nodes that have created a reporting message with the identifier of the current selection message, wherein the nodes of the network are further configured to route the status message to a network node that is communicatively coupled to the mobile node, and wherein the communication unit of the network node is further configured to send the status message to the mobile node.

19. The network of claim 12, wherein the network is a wireless sensor network, each network node comprising a receiver unit further configured to receive the selection message and the further reporting message, and wherein the communication unit is configured to send the reporting message and the further reporting message so that the reporting message and the further reporting message are receivable by the receiver unit of a coupled node.

20. An application device communicatively coupled to a network of nodes comprising network nodes and a gateway node,
- wherein the application device is configured to receive a reporting message from the gateway node, to gather one or more reporting messages, and to provide portions of data of the one or more reporting messages to a device comprising a user interface, wherein the reporting message comprises an identifier of a mobile node, an unique identifier of a current selection message sent from the mobile node, and an identifier of a selected network node from which the reporting message originates, the identifier of the current selection message being a part of a selection message that originates from the mobile node and that comprises a selection condition fulfilled by the selected network node and wherein the gathered one or more reporting messages comprise the identifier of the current selection message.

21. The application device of claim 20, wherein the application device is further configured to create a status message comprising one or more identifiers of network nodes that have created the one or more reporting messages.

22. The application device of claim 21, wherein the application device is further configured to send the status message to the gateway node so that the status message is transmitted through the network and the mobile node to a mobile application device.

23. The application device of claim 21, wherein the application device comprises a communication unit configured to send the status message to a mobile application device over a wireless connection.

24. A mobile application device comprising a communication unit configured to receive a message comprising one or more identifiers of selected network nodes of a network and that are selected by a selection message that comprises a unique identifier of a current selection message and a selection condition fulfilled by the selected network nodes and to gather the message and a further message comprising further one or more identifiers of selected network nodes, wherein a reporting message originates from a selected network node and comprises an identifier of the current selection message, wherein the identifier of the current selection message is a portion of a selection message originating from a mobile node.

25. The mobile application device of claim 24, further comprising a user interface configured to display data related to an identifier of one of the selected network nodes to a user of the mobile application device.

26. The mobile application device of claim 25, wherein the mobile application device is further configured to indicate a location of the one selected network node to the user.

27. The mobile application device of claim 25, wherein the communication unit is configured to receive a status message from an application device using a wireless connection to the application device, wherein the status message comprises identifiers of the selected network nodes.

28. The mobile application device of claim 24, wherein the communication unit is further configured to receive from the mobile node a message selected from the group consisting of: an activation message, the selection message, the reporting message, and the status message, wherein the activation message comprises data representing an activation of a communication unit of the mobile node, wherein the selection message comprises an identifier of the mobile node and the unique identifier of a current selection message that is configured to select the one or more network nodes that fulfill the selection condition, wherein the reporting message has been created by a selected network node and comprises the identifier of the mobile node, the identifier of the current selection message and an identifier of the selected network node, and wherein the status message has been created by an application device and comprises one or more identifiers of network nodes that have been selected by the selection message comprising the identifier of the current selection message.

29. A system for selecting one or more network nodes of a network, the system comprising:
a network of nodes comprising network nodes and a gateway node, each network node being communicatively coupled to a further network node and the gateway node being configured to receive messages from a set of network nodes and to transmit the received messages to an application device, a network node of the network comprising:
a receiver unit configured to receive a selection message from a mobile node, the selection message comprising an identifier of the mobile node, a unique identifier of a current message, and a selection condition;
a processing unit configured to create a reporting message comprising the mobile node identifier, the unique identifier of the current selection message, and an identifier of the network node and configured to verify that the selection condition is fulfilled when the selection condition is fulfilled and to create the reporting message when the selection condition is not fulfilled; and
a communication unit configured to route the reporting message and a further reporting message created by a processing unit of a further network node to a specific node that is configured to send the reporting message and the further reporting message to an external device;
wherein the mobile node is adapted for selecting one or more network nodes of the network, the mobile node comprising a communication unit configured for sending a selection message that is receivable by a network node, the selection message configured to select the one or more network nodes, wherein the selection message comprises an identifier of the mobile node and a unique identifier of a current selection message; and
a mobile application device comprising a communication unit configured to receive a message comprising one or more identifiers of selected network nodes of the network and to gather the message and a further message comprising further one or more identifiers of selected network nodes, wherein a reporting message originates from a selected network node and comprises an identifier of the current selection message, wherein the identifier of the current selection message is a portion of a selection message originating from a mobile node.

30. The system of claim 29, wherein
the application device is configured to receive a reporting message from the gateway node, to gather one or more reporting messages, and to provide portions of data of the one or more reporting messages to a device comprising a user interface, and
wherein the reporting message comprises an identifier of the mobile node, an identifier of the current selection message, and an identifier of a selected network node from which the reporting message originates, the identifier of the current selection message being a part of a selection message originating from the mobile node and wherein the gathered one or more reporting messages comprise the identifier of the current selection message.

31. A method for selecting one or more network nodes of a network, wherein each network node of the network is communicatively coupled to another network node of the network, the method comprising:
creating a selection message at a mobile node, the selection message configured to select the one or more network nodes, wherein the selection message comprises a mobile node identifier, a unique identifier of a current selection message, and a selection condition;
sending the selection message, such that the selection message is receivable by a network node of the network;
receiving the selection message at the network node;
checking if the network node is a selected network node, wherein the checking includes verifying that the selection condition is fulfilled;
when the network node is a selected network node, creating a reporting message comprising the mobile node identifier, the unique identifier of an identifier of the current selection message, and an identifier of the selected network node;
receiving the reporting message at an external device; and
at the external device, gathering the reporting message and a further reporting message comprising the identifier of the current selection message.

32. The method of claim 31, further comprising repeatedly sending the selection message.

33. The method of claim 32, further comprising:
sending a new selection message from the network node to a further network node that is communicatively coupled to the network node, wherein the new selection message comprises data of the selection message and a new selection condition; and
verifying at the further network node that the new selection condition is fulfilled.

34. The method of claim 32, wherein the external device is an application device communicatively coupled to the network, and further comprising creating a status message with the application device, the status message comprising one or more identifiers of network nodes that have created a reporting message comprising the identifier of the current selection message.

35. The method of claim 34, further comprising sending the status message from the application device to the mobile application device using a wireless connection.

36. The method of claim 31 further comprising receiving data comprising the unique identifier of the current selection message at a mobile application device.

37. The method of claim 36, further comprising displaying on the mobile application device further data related to the identifier of the network node to a user of the mobile application device.

38. The method of claim 31, further comprising sending from the mobile node to the mobile application device a messages selected from the group consisting of: an activation message comprising data representing an activation of a communication unit of the mobile node, the selection message, the reporting message, and a status message,
wherein the status message comprises one or more identifiers of network nodes that have created a reporting message comprising the identifier of the current selection message.

* * * * *